United States Patent
Tobari et al.

(10) Patent No.: US 7,821,223 B2
(45) Date of Patent: Oct. 26, 2010

(54) VECTOR CONTROLLER FOR A PERMANENT MAGNET MOTOR AND INVERTER MODULE

(75) Inventors: Kazuaki Tobari, Hitachiota (JP); Tsunehiro Endo, Hitachiota (JP); Kiyoshi Sakamoto, Hitachinaka (JP); Daisuke Maeda, Hitachi (JP); Shigehisa Aoyagi, Hitachi (JP)

(73) Assignees: Hitachi, Ltd., Tokyo (JP); Hitachi Car Engineering Co., Ltd, Ibaraki (JP)

( * ) Notice: Subject to any disclaimer, the term of this patent is extended or adjusted under 35 U.S.C. 154(b) by 663 days.

(21) Appl. No.: 11/769,802

(22) Filed: Jun. 28, 2007

(65) Prior Publication Data
US 2008/0048606 A1 Feb. 28, 2008

(30) Foreign Application Priority Data
Jun. 29, 2006 (JP) .............................. 2006-178895

(51) Int. Cl.
*H02P 27/04* (2006.01)
(52) U.S. Cl. .................... 318/807; 318/801; 318/767
(58) Field of Classification Search ................ 318/801, 318/807, 767
See application file for complete search history.

(56) References Cited

U.S. PATENT DOCUMENTS 6,396,236 B1* 5/2002 Luukko ...................... 318/700
6,462,492 B1* 10/2002 Sakamoto et al. ......... 318/400.32
6,492,788 B1* 12/2002 Agirman et al. ............. 318/700
2001/0026140 A1* 10/2001 Ishida ......................... 318/727
2008/0191656 A1* 8/2008 Satake et al. ................. 318/722

OTHER PUBLICATIONS

"Position and Speed Sensorless Control for PMSM Drive Using Direct Position Error Estimation", Sakamoto et al, IECOn'01: The 27th Annual Conference of the IEEE Industrial Electronics Society, pp. 1680-1685, vol. 3, Nov. 29-Dec. 2, 2001.
S. Morimoto, et al., "Wide Speed Control of Interior Permanent Magnet Synchronous Motor" Journal of the Institute of Electrical Engineers of Japan, vol. 114-D, No. 6, '94 p. 668.

* cited by examiner

*Primary Examiner*—Walter Benson
*Assistant Examiner*—Kawing Chan
(74) *Attorney, Agent, or Firm*—Antonelli, Terry, Stout & Kraus, LLP.

(57) ABSTRACT

In a system in which current is detected in an inexpensive manner or in a system in which a position detector is omitted, the present invention provides a high-efficiency vector controller for a permanent magnet motor that can minimize current at the same torque even when there is setting error (R–R*) in resistance. Even when a current value commanded for the d-axis is set to zero, a virtual inductance value calculated from a detected q-axis current value is used for output voltage value calculation and phase error estimation calculation; so even if there is setting error (R–R*) in resistance, current can be minimized at the same torque and thereby the present invention can provide a high-efficiency vector controller for a permanent magnet motor.

16 Claims, 7 Drawing Sheets

VECTOR CONTROLLER FOR A PERMANENT MAGNET MOTOR AND INVERTER MODULE

CLAIM OF PRIORITY

The present application claims priority from Japanese application serial no. 2006-178895, filed on Jun. 29, 2006, the content of which is hereby incorporated by reference into this application.

FIELD OF THE INVENTION

The present invention is involved in a maximum torque-current ratio control method applied to a permanent magnet motor, and relates to technology for achieving a high-efficiency control operation.

BACKGROUND OF THE INVENTION

A conventional maximum torque-current ratio control method is described in "Wide Speed Control of Interior Permanent Magnet Synchronous Motor" Journal of The Institute of Electrical Engineers of Japan, Vol. 114-D, No. 6, '94 p. 668, in which a motor constant and a q-axis current value are used to generate a d-axis current value and the reluctance torque of the motor is fully used to minimize current at the same torque.

[Non-patent Document 1] "Wide Speed Control of Interior Permanent Magnet Synchronous Motor" Journal of The Institute of Electrical Engineers of Japan, Vol. 114-D, No. 6, '94 p. 668.

SUMMARY OF THE INVENTION

In vector control in which a position sensor is attached to a motor and a detected motor position and a detected frequency are used, current can be minimized at the same torque even when there is setting error $\Delta R(=R-R^*)$ between a motor resistance R and a setting $R^*$ used for control.

In position sensor-less control, however, axis error, which is a deviation between a commanded rotational phase value and the rotational phase value of the permanent magnet motor, is estimated by calculation in which the motor constant and d-axis and q-axis current values are used; if there is setting error $(R-R^*)$ in resistance, when non-zero d-axis current is generated, therefore, estimation error is included in estimated axis error. This makes it difficult to minimize current at the same torque.

An object of the present invention is to provide a high-efficiency vector controller for a permanent magnet motor that can minimize current even when there is setting error $(R-R^*)$ in resistance.

In the present invention, even when a current value commanded for the d-axis is zero, a virtual inductance value is used to calculate the value of an output voltage produced by a converter and estimated axis error.

According to the present invention, even when a current value commanded for the d-axis is set to zero, a virtual inductance value calculated from a detected q-axis current value is used for output voltage value calculation and phase error estimation calculation; so the present invention provides a high-efficiency vector controller for a permanent magnet motor that can minimize current at the same torque even when there is setting error $(R-R^*)$ in resistance.

DESCRIPTION OF THE PREFERRED EMBODIMENTS

Embodiments of the present invention will be described below in detail with reference to the drawings.

First Embodiment

Figure 1:
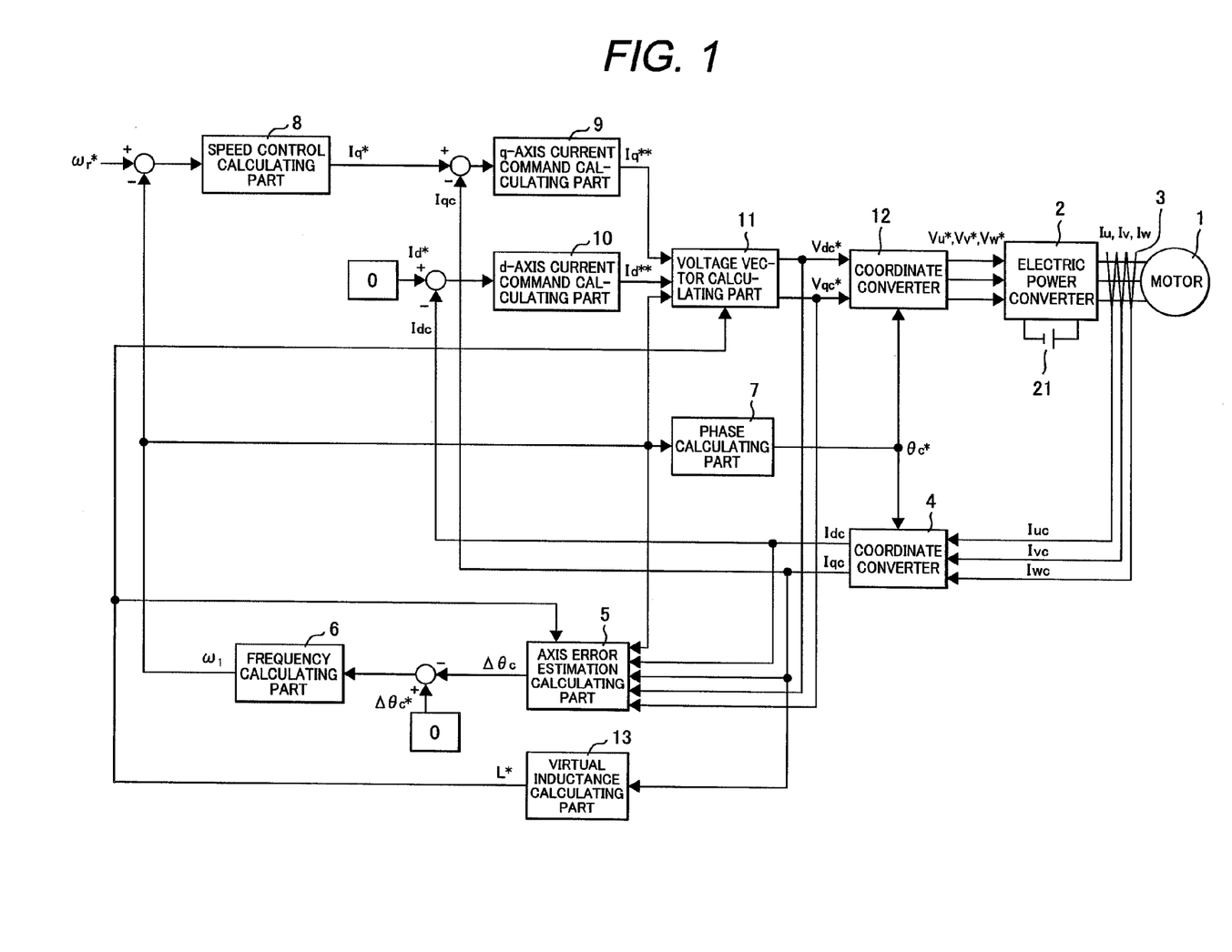
FIG. 1 shows the structure of a high-efficiency vector controller for a permanent magnet motor in an embodiment.

FIG. 1 shows an example of the structure of a high-efficiency vector controller for a permanent magnet motor in an embodiment of the present invention.

Reference numeral 1 indicates a permanent magneto motor; reference numeral 2 indicates an electric power converter for outputting voltages in proportional to commanded voltage values Vu*, Vv*, and Vw* of a three-phase AC current; reference numeral 21 indicates a DC power supply; reference numeral 3 indicates a current detector that can detect three-phase AC currents Iu, Iv, and Iw; reference numeral 4 indicates a coordinate converter for outputting detected d-axis and q-axis current values Idc and Iqc according to detected values Iuc, Ivc, and Iwc of the three-phase AC currents Iu, Iv, and Iw and to a commanded rotation phase value θc* of the electric power converter; reference numeral 5 indicates an axis error estimation calculating part for estimating axis error, which is a deviation between a commanded rotation phase value θc* and a motor rotation phase value θ, by calculation according to commanded d-axis and q-axis voltage values Vdc* and Vqc*, a calculated frequency value $\omega_1$, the detected current values Idc and Iqc, a calculated virtual inductance value $L^*$, and a motor constant and then outputting estimated axis error Δθc; reference numeral 6 indicates a frequency calculating part for outputting the calculated frequency $\omega_1$ so that the estimated axis error Δθc matches a commanded axis error Δθc* (zero); reference numeral 7 indicates a phase calculating part for integrating the calculated frequency $\omega_1$ and outputting a commanded rotation phase value θc* to the coordinate converter 4 and another coordinate converter 12; reference numeral 8 indicates a speed control calculating part for outputting a commanded q-axis current value Iq* so that a command speed $\omega_r^*$ matches the calculated frequency $\omega_1$; reference numeral 9 indicates a q-axis current command calculating part for outputting a second commanded q-axis current value Iq** according to a deviation between the commanded q-axis current value Iq* and the detected current value Iqc; reference numeral 10 indicates a d-axis current command calculating part for outputting a second commanded d-axis current value Id** according to a deviation between the commanded d-axis current value Id* (zero) and the detected current value Idc; reference numeral 11 indicates a voltage vector calculating part for outputting commanded d-axis and q-axis voltage values Vdc* and Vqc* according to the electric constant of the motor 1, the second commanded current values Id and Iq, the calculated frequency $\omega_1$, and the calculated inductance value L*; reference numeral 12 indicates a coordinate converter for outputting commanded voltage values Vu*, Vv*, and Vw* of the three-phase AC currents according to the commanded voltage values Vdc* and Vqc* and to the commanded rotation phase value θc*; reference numeral 13 indicates a virtual inductance calculating part for outputting a calculated inductance value L*, which is used for calculation by the axis error estimation calculating part 5 and voltage vector calculating part 11, according to the detected q-axis current value Iqc.

Described first will be the basic operation in the position sensor-less control method in which the virtual inductance calculating part 13, which is a feature of the present invention, is used.

A motor torque $\tau_m$ is obtained from equation (1).

[Equation 1]

$$\tau_m = \frac{3}{2} \cdot Pm \cdot (Ke - (Ld - Lq) \cdot Id) \cdot Iq \quad (1)$$

where
Pm: Number of motor pole pairs
Ke: Electric power generation coefficient
Ld: Inductance value on the d-axis
Lq: Inductance value on the q-axis
Id: Motor current on the d-axis
Iq: Motor current on the q-axis Let a calculation expression for achieving maximum torque-current ratio control be −X. Then, the axis error Δθ (=θc*−θ), which is a deviation between a commanded rotation phase value θc* generated at that time and the rotation phase value θ of the motor is defined as $\Delta\theta_{opt}$ as in equation (2).

[Equation 2]

$$\Delta\theta_{opt} = \sin^{-1}[-X] \quad (2)$$

When the axis error $\Delta\theta_{opt}$ occurs, a matrix for coordinate conversion from the detected current values Idc and Iqc on the control axis (dc-qc) to the motor currents Id and Iq on a motor axis (d-q) is represented as in equation (3).

[Equation 3]

$$\begin{bmatrix} Id \\ Iq \end{bmatrix} = \begin{bmatrix} \cos\Delta\theta_{opt} & -\sin\Delta\theta_{opt} \\ \sin\Delta\theta_{opt} & \cos\Delta\theta_{opt} \end{bmatrix} \cdot \begin{bmatrix} Idc \\ Iqc \end{bmatrix} \quad (3)$$

Since the commanded d-axis value Id* is set to zero (Id*=Idc=0), equations (2) and (3) give equation (4).

[Equation 4]

$$\begin{bmatrix} Id \\ Iq \end{bmatrix} = \begin{bmatrix} \dfrac{X}{\sqrt{1-X^2}} \end{bmatrix} \cdot [Iqc] \quad (4)$$

When equation (4) is assigned to equation (1), which is a torque equation of the motor, equation (5) is given.

[Equation 5]

$$\tau_m = \frac{3}{2} \cdot Pm \cdot Iqc \cdot \sqrt{1-X^2}\,(Ke - (Ld - Lq) \cdot Iqc \cdot X) \quad (5)$$

To obtain calculation expression X for achieving maximum torque-current ratio control at the same motor torque, it suffices to solve equation (6).

[Equation 6]

$$\frac{d\tau_m}{dX} = \frac{3 \cdot Pm \cdot Iqc \cdot \begin{bmatrix} -Ke \cdot X + Iqc \cdot (Ld-Lq) \cdot \\ (2 \cdot X^2 - 1) \end{bmatrix}}{2\sqrt{1-X^2}} = 0 \quad (6)$$

Equation (6) is solved for X as shown below.

[Equation 7]

$$X = \frac{Ke - \sqrt{Ke^2 + 8 \cdot (Ld-Lq)^2 \cdot Iqc^2}}{4 \cdot (Ld-Lq) \cdot Iqc} \quad (7)$$

When equation (7) is assigned to equation (2) to obtain the axis error Δθ, equation (8) is obtained.

[Equation 8]

$$\Delta\theta_{opt} = \sin^{-1}\left[\frac{Ke - \sqrt{Ke^2 + 8 \cdot (Ld-Lq)^2 \cdot Iqc^2}}{4 \cdot (Ld-Lq) \cdot Iqc}\right] \quad (8)$$

If the axis error $\Delta\theta_{opt}$ as in equation (8) occurs, even when the commanded d-axis current value Id* is set to zero, maximum torque-current ratio control can be achieved.

In a method of generating the axis error $\Delta\theta_{opt}$, the fact that the estimated axis error Δθc, which is an output from the axis error estimation calculating part 5, has sensitivity only in the q-axis inductance value Lq, is used.

In the voltage vector calculating part 11 shown in FIG. 1, the commanded d-axis and q-axis voltage values Vdc* and Vqc*, which are calculated by use of the second commanded d-axis and q-axis current values Id and Iq, the calculated frequency value $\omega_1$, the motor constant setting, and the calculated inductance value L*, are calculated from equation (9).

[Equation 9]

$$\begin{bmatrix} Vdc^* \\ Vqc^* \end{bmatrix} = \begin{bmatrix} -\omega_1 \cdot L^* & R^* \\ R^* & \omega_1 \cdot Ld^* \end{bmatrix} \cdot \begin{bmatrix} Id^{} \\ Iq^{} \end{bmatrix} + \begin{bmatrix} 0 \\ \omega_1 \cdot Ke^* \end{bmatrix} \quad (9)$$

If there is arbitrary axis error Δθ, the voltages Vd and Vq, which are calculated on the control side and applied to the motor, are given by equation (10).

[Equation 10]

$$\begin{bmatrix} Vd \\ Vq \end{bmatrix} = \begin{bmatrix} \cos\Delta\theta & -\sin\Delta\theta \\ \sin\Delta\theta & \cos\Delta\theta \end{bmatrix} \cdot \left( \begin{bmatrix} -\omega_1 \cdot L^* & R^* \\ R^* & \omega_1 \cdot Ld^* \end{bmatrix} \cdot \begin{bmatrix} Id^{} \\ Iq^{} \end{bmatrix} + \begin{bmatrix} 0 \\ \omega_1 \cdot Ke^* \end{bmatrix} \right) \quad (10)$$

The d-axis and q-axis voltages Vd and Vq applied to the motor are represented by use of the axis error $\Delta\theta$, the detected current values Idc and Idq, and the motor constant, as shown in equation (11).

[Equation 11]

$$\begin{bmatrix} Vd \\ Vq \end{bmatrix} = \begin{bmatrix} -\omega_r \cdot L_q & R \\ R & \omega_r \cdot Ld \end{bmatrix} \cdot \begin{bmatrix} \cos\Delta\theta & -\sin\Delta\theta \\ \sin\Delta\theta & \cos\Delta\theta \end{bmatrix} \cdot \begin{bmatrix} Idc \\ Iqc \end{bmatrix} + \begin{bmatrix} 0 \\ \omega_1 \cdot Ke \end{bmatrix} \quad (11)$$

Equation (10) equals equation (11), so if it is considered that the commanded d-axis current value Id* is set to zero and the commanded q-axis current value Iq* is a prescribed value, the output values Id and Iq respectively supplied from the commanded d-axis current calculating part 10 and the commanded q-axis current calculating part 9 are represented as in equation (12).

[Equation 12]

$$\begin{bmatrix} Id^{**} = \dfrac{c_1 \cdot Iqc + c_2}{2 \cdot (R^{*2} + Ld^* \cdot L^* \cdot \omega_1^2)} \\ Iq^{**} = \dfrac{c_3 \cdot Iqc + c_4}{2 \cdot (R^{*2} + Ld^* \cdot L^* \cdot \omega_1^2)} \end{bmatrix} \quad (12)$$

where
$c_1 = \omega_1 \cdot [2 \cdot R \cdot L^* - R^* \cdot (Ld + Lq)] +$
$\qquad \omega_1 \cdot (Ld - Lq) \cdot [-\omega_1 \cdot L^* \cdot \sin 2\Delta\theta + R^* \cdot \cos 2\Delta\theta]$
$c_2 = 2 \cdot [-\omega_1^2 \cdot L^* \cdot Ke^* + \omega_1 \cdot Ke \cdot (R^* \cdot \sin\Delta\theta + \omega_1 \cdot L^* \cdot \cos\Delta\theta)]$
$c_3 = 2 \cdot R \cdot R^* \cdot \omega_1^2 \cdot Ld^* \cdot (Ld + Lq) -$
$\qquad \omega_1 \cdot (Ld - Lq) \cdot [R^* \cdot \sin 2\Delta\theta + \omega_1 \cdot Ld^* \cdot \cos 2\Delta\theta]$
$c_4 = 2 \cdot [-\omega_1 \cdot R^* \cdot Ke^* + \omega_1 \cdot Ke \cdot (-\omega_1 \cdot Ld^* \cdot \sin\Delta\theta + R^* \cdot \cos\Delta\theta)]$ The axis error estimation calculating part 5 uses the calculated d-axis and q-axis current values Idc and Iqc, the calculated frequency value $\omega_1$, the motor constant setting, and the calculated inductance value L* to calculate the estimated axis error $\Delta\theta c$ according to equation (13).

[Equation 13]

$$\Delta\theta c = \tan^{-1}\left[\frac{Vdc^* - R^* \cdot Idc + \omega_1 \cdot L^* \cdot Iqc}{Vqc^* - R^* \cdot Iqc - \omega_1 \cdot L^* \cdot Idc}\right] \quad (13)$$

When equations (9) and (12) are assigned to equation (13), equation (14) is given.

[Equation 14]

$$\Delta\theta c = \tan^{-1}\left[\frac{\omega_1 \cdot ([2L^* - (Ld + Iq)] \cdot Iqc + (Id - Lq) \cdot Iqc \cdot \cos[2\Delta\theta] + 2Ke \cdot \sin[\Delta\theta])}{2\begin{bmatrix}(R - R^*) \cdot Iqc + \omega_1 \cdot \\ \cos[\Delta\theta](Ke - Iqc \cdot (Ld - Lq) \cdot \sin[\Delta\theta])\end{bmatrix}}\right] \quad (14)$$

The frequency calculating part 6 calculates the frequency $\omega_1$ so that the estimated axis error $\Delta\theta c$ output from the axis error estimation calculating part 5 matches zero. When the speed is fixed, the numerator terms of equation (14) result in zero, equation 15 holds.

[Equation 15]

$$\begin{aligned}
&[2L^* - (Ld + Lq)] \cdot Iqc + \\
&(Ld - Lq) \cdot Iqc \cdot \cos[2\Delta\theta] + \\
&\quad 2Ke \cdot \sin[\Delta\theta] = [2L^* - (Ld + Lq)] \cdot Iqc + \\
&\qquad (Ld - Lq) \cdot Iqc \cdot \cos[2\Delta\theta] + \\
&\qquad 2Ke \cdot \sin[\Delta\theta] \\
&= [2L^* - (Ld + Lq)] \cdot Iqc + \\
&\qquad (Ld - Lq) \cdot Iqc(1 - 2\sin^2[\Delta\theta]) + \\
&\qquad 2Ke \cdot \sin[\Delta\theta] \\
&= 0
\end{aligned} \quad (15)$$

When the axis error $\Delta\theta$ is obtained from equation (15), equation (16) is then obtained.

[Equation 16]

$$\Delta\theta = \sin^{-1}\left[\frac{Ke - \sqrt{Ke^2 + 4 \cdot (Ld - Lq) \cdot (L^* - Lq) \cdot Iqc^2}}{2 \cdot (Ld - Lq) \cdot Iqc}\right] \quad (16)$$

To perform the maximum torque-current ratio control, the calculated inductance value L* may be set so that the axis error $\Delta\theta$ matches the axis error $\Delta\theta_{opt}$ in equation (8) described above.

That is, if equation (17) is satisfied, the current can be minimized at the same torque.

[Equation 17]

$$\frac{Ke - \sqrt{Ke^2 + 8 \cdot (Ld - Lq)^2 \cdot Iqc^2}}{4 \cdot (Ld - Lq) \cdot Iqc} = \quad (17)$$
$$\left(Ke - \sqrt{Ke^2 + 4 \cdot (Ld - Lq) \cdot (L^* - Lq) \cdot Iqc^2}\right) / 2 \cdot (Ld - Lq) \cdot Iqc$$

When equation (17) is solved for the calculated virtual inductance value L*, equation (18) is yielded.

[Equation 18]

$$L^* = \frac{Ke \cdot \left(-Ke + \sqrt{Ke^2 + 8 \cdot (Ld - Lq)^2 \cdot Iqc^2}\right)}{8 \cdot (Ld - Lq) \cdot Iqc^2} + \frac{1}{2}(Ld + Lq) \quad (18)$$

That is, the virtual inductance calculating part 13 may output the calculated inductance value L* as shown in equation (19).

[Equation 19]

$$L^* = \frac{Ke^* \cdot \left(-Ke^* + \sqrt{Ke^{*2} + 8 \cdot (Ld^* - Lq^*)^2 \cdot Iqc^2}\right)}{8 \cdot (Ld^* - Lq^*) \cdot Iqc^2} + \frac{1}{2}(Ld^* + Lq^*) \quad (19)$$

Next, an effect provided by the virtual inductance calculating part 13, which is a feature of the present invention, will be described.

In the controller in FIG. 1, a load torque was applied to the motor 1, and a resistance setting R* to be set in the voltage vector calculating part 11 and the axis error estimation calculating part 5 was taken as a parameter. A motor current $I_1$ generated was then observed.

Figure 2:
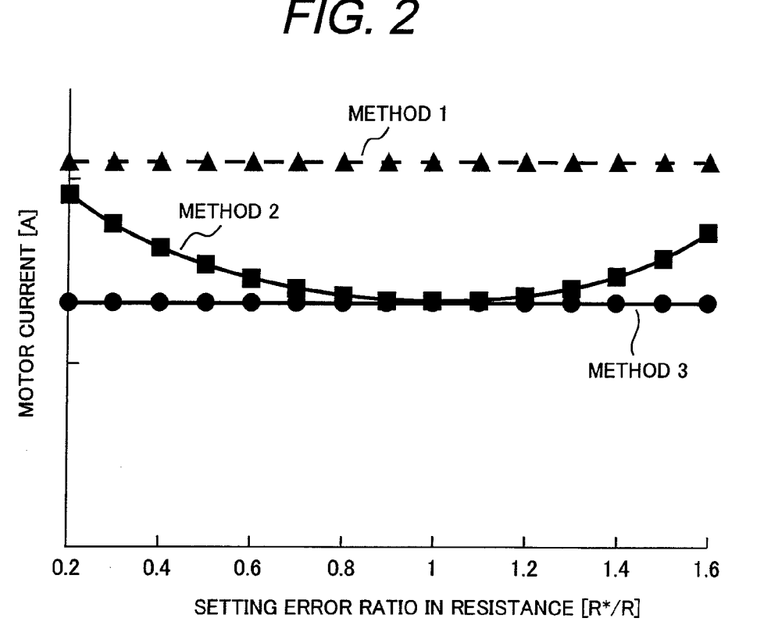
FIG. 2 shows the relation between the resistance setting error ratio and motor current.

FIG. 2 shows the relation between the resistance setting error ratio (R*/R) and the motor current value, which includes an effect provided by the present invention.

Characteristics of individual methods are shown in the drawing.

Method 1: The maximum torque-current ratio control is not performed (Id*=0, L*=Lq*).

Method 2: Characteristics in the method described in said Non-patent Document 1 (the motor constant and q-axis current value are used to calculate the d-axis current value).

Method 3: Characteristics when the virtual inductance calculating part 13 is used.

In method 1, the commanded d-axis current value Id* is set to zero, so there is no effect by the resistance setting error ratio (R*/R), causing the motor current to be held at a fixed value. However, the current value is large.

In method 2, the current can be minimized when the resistance setting error ratio (R*/R) is 1. However, as the resistance setting error ratio (R*/R) deflects from 1, the current value becomes larger.

In method 3, the use of the virtual inductance calculating part 13 enables the current to be minimized even when the resistance setting error ratio is not 1.

Figure 3:
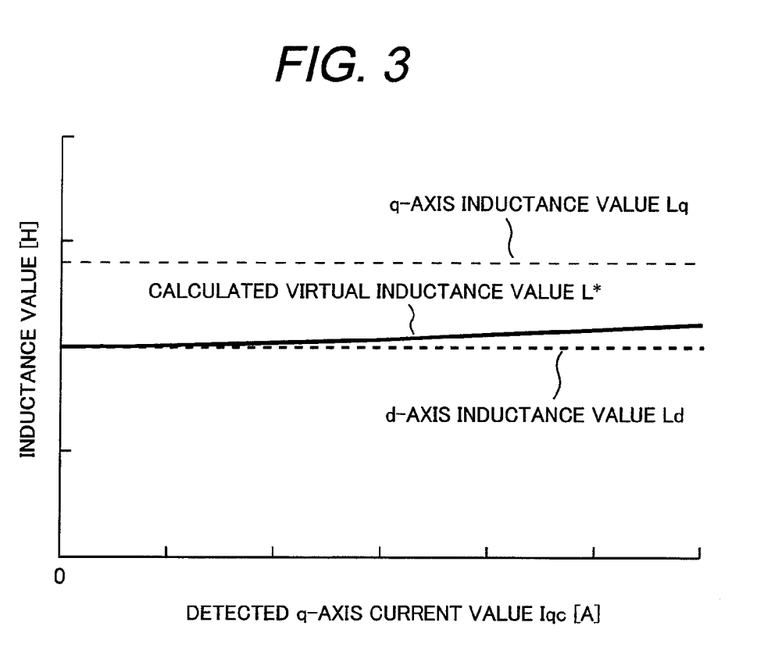
FIG. 3 shows the relation between the detected q-axis current value Iqc and the calculated virtual inductance value $L^*$.

In this embodiment, the virtual inductance calculating part 13 sequentially gives the calculated inductance value L* according to equation (19), but a similar effect can also be obtained by referencing the relation between the calculated q-axis current detection value and the virtual inductance value L* as indicated by the table in FIG. 3.

Second Embodiment

Figure 4:
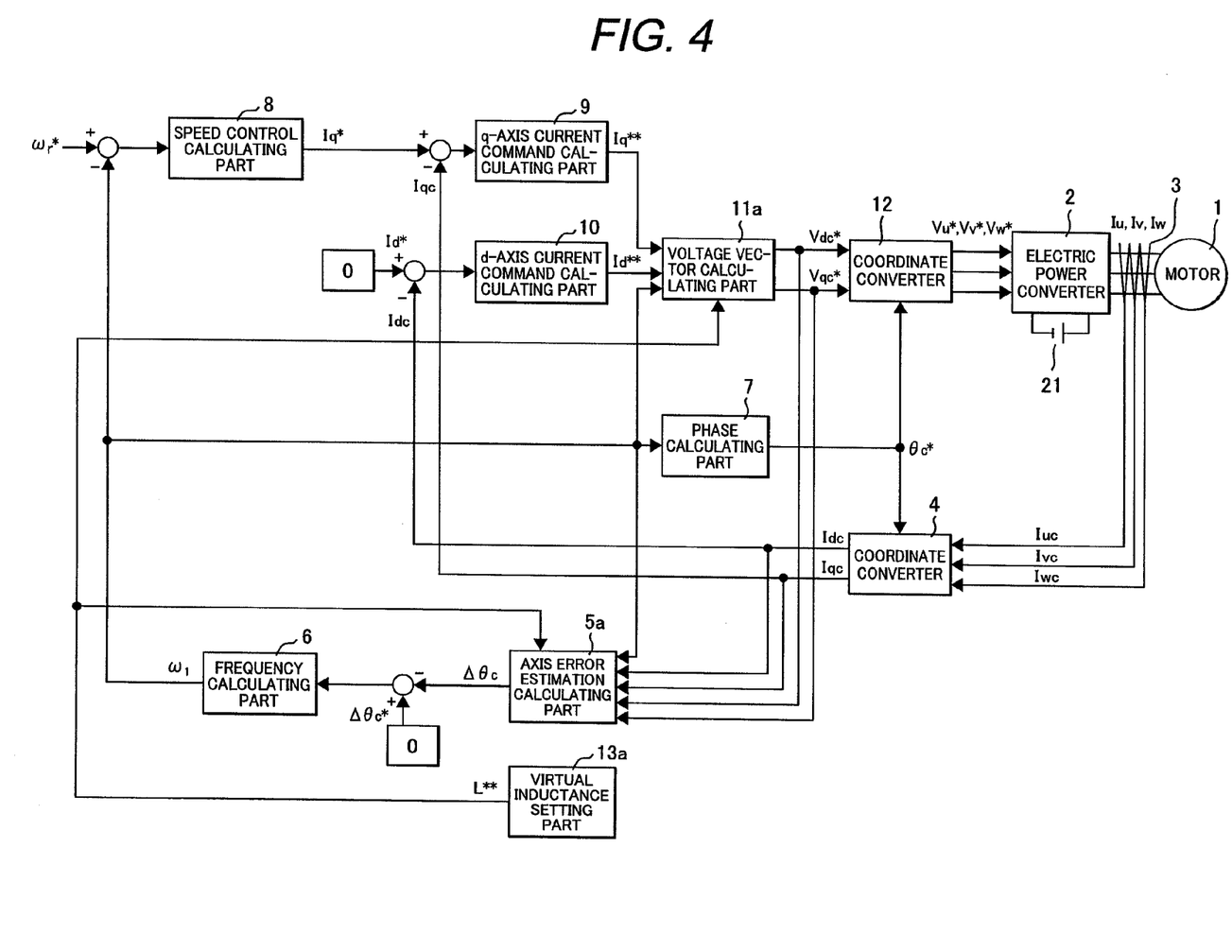
FIG. 4 shows the structure of a high-efficiency vector controller for a permanent magnet motor in another embodiment.

FIG. 4 shows another embodiment of the present invention.

In the first embodiment, the detected q-axis current value Iqc is used to give the calculated virtual inductance value L*. However, a high-efficiency vector controller for a permanent magnet motor in this embodiment uses a virtual inductance setting L** to perform voltage vector calculation and calculation for estimating axis error. An exemplary structure of this type of vector controller will be described below.

Reference numerals 1 to 4, 6 to 10, 12, and 21 in the drawing indicate elements identical to the corresponding elements in FIG. 1.

Reference characters 5a indicate an axis error estimation calculating part for estimating, by calculation, axis error, which is a deviation between the commanded rotation phase value θc* and the motor rotation phase value θ, from the commanded voltage values Vdc* and Vqc*, the calculated frequency value $\omega_1$, the detected current values Idc and Iqc, the virtual inductance setting L**, and the motor constant as in equation (20) and then outputting estimated axis error Δθc.

[Equation 20]

$$\Delta\theta c = \tan^{-1}\left[\frac{Vdc^* - R^* \cdot Idc - \omega_1 \cdot L^{**} \cdot Iqc}{Vqc^* - R^* \cdot Iqc - \omega_1 \cdot L^{**} \cdot Idc}\right] \quad (20)$$

Reference characters 11a indicate a voltage vector calculating part for outputting the commanded d-axis and q-axis voltage values Vdc* and Vqc* according to the electric constant of the motor 1, the second commanded current values Id and Iq, the calculated frequency $\omega_1$, and the inductance setting L** as in equation (21).

[Equation 21]

$$\begin{bmatrix} Vdc^* \\ Vqc^* \end{bmatrix} = \begin{bmatrix} -\omega_1 \cdot L^{**} & R^* \\ R^* & \omega_1 \cdot Ld^* \end{bmatrix} \cdot \begin{bmatrix} Id^{} \\ Iq^{} \end{bmatrix} + \begin{bmatrix} 0 \\ \omega_1 \cdot Ke^* \end{bmatrix} \quad (21)$$

Reference characters 13a indicate a virtual inductance setting part for outputting the virtual inductance setting L**.

A range in which the calculated inductance value L* in equation (18) is set will be considered below.

Suppose that the d-axis inductance value Ld is assigned to L*.

[Equation 22]

$$Ld = \frac{Ke \cdot \left(-Ke + \sqrt{Ke^2 + 8 \cdot (Ld - Lq)^2 \cdot Iqc^2}\right)}{8 \cdot (Ld - Lq) \cdot Iqc^2} + \frac{1}{2}(Ld + Lq) \quad (22)$$

Equation (23) is yielded from equation (22).

[Equation 23]

$$\frac{1}{2} \cdot (Ld - Lq) \cdot 8 \cdot (Ld - Lq) \cdot Iqc^2 + Ke^2 = \\ \left(ke \cdot \sqrt{Ke^2 + 8 \cdot (Ld - Lq)^2 \cdot Iqc^2}\right) \quad (23)$$

When both sides are squared, equation (24) is given.

[Equation 24]

$$16 \cdot (Ld-Lq)^4 \cdot Iqc^4 = 0 \quad (24)$$

That is, equation (24) holds when there is almost no load (Iqc≈0), and L* converges to the d-axis inductance value Ld.

When the detected q-axis current value Iqc is infinite, equation (25) holds.

[Equation 25]

$$L^{**} \approx \frac{1}{2}(Ld + Lq) \quad (25)$$

When the q-axis inductance value Lq is larger than the d-axis inductance value Ld, the setting range of the virtual inductance value L** is obtained from equation (26).

[Equation 26]

$$Ld \le L^{**} < \frac{1}{2}(Ld - Lq) \quad (26)$$

That is, when the load toque applied to the motor is fixed, the virtual inductance setting L may be set in the virtual inductance setting part 13***a* within the range indicated by equation 27, so that the motor current is minimized.

[Equation 27]

$$Ld^* \le L^{**} < \frac{1}{2}(Ld^* - Lq^*) \quad (27)$$

When the q-axis inductance value Lq is smaller than the d-axis inductance value Ld, the virtual inductance setting L** may be set within the range indicated by equation 28, so that the motor current is minimized.

[Equation 28]

$$\frac{1}{2}(Ld^* - Lq^*) \le L^{**} < Ld^* \quad (28)$$

Unless the load torque is equivalent to an extreme heavy load, even when the virtual inductance setting L** is set to an equivalent to the d-axis inductance value Ld, a preferable result is obtained.

In this embodiment as well, torque-current ratio characteristics, which are almost the same as when the virtual inductance calculating part 13 is provided, can be obtained.

Third Embodiment

Figure 5:
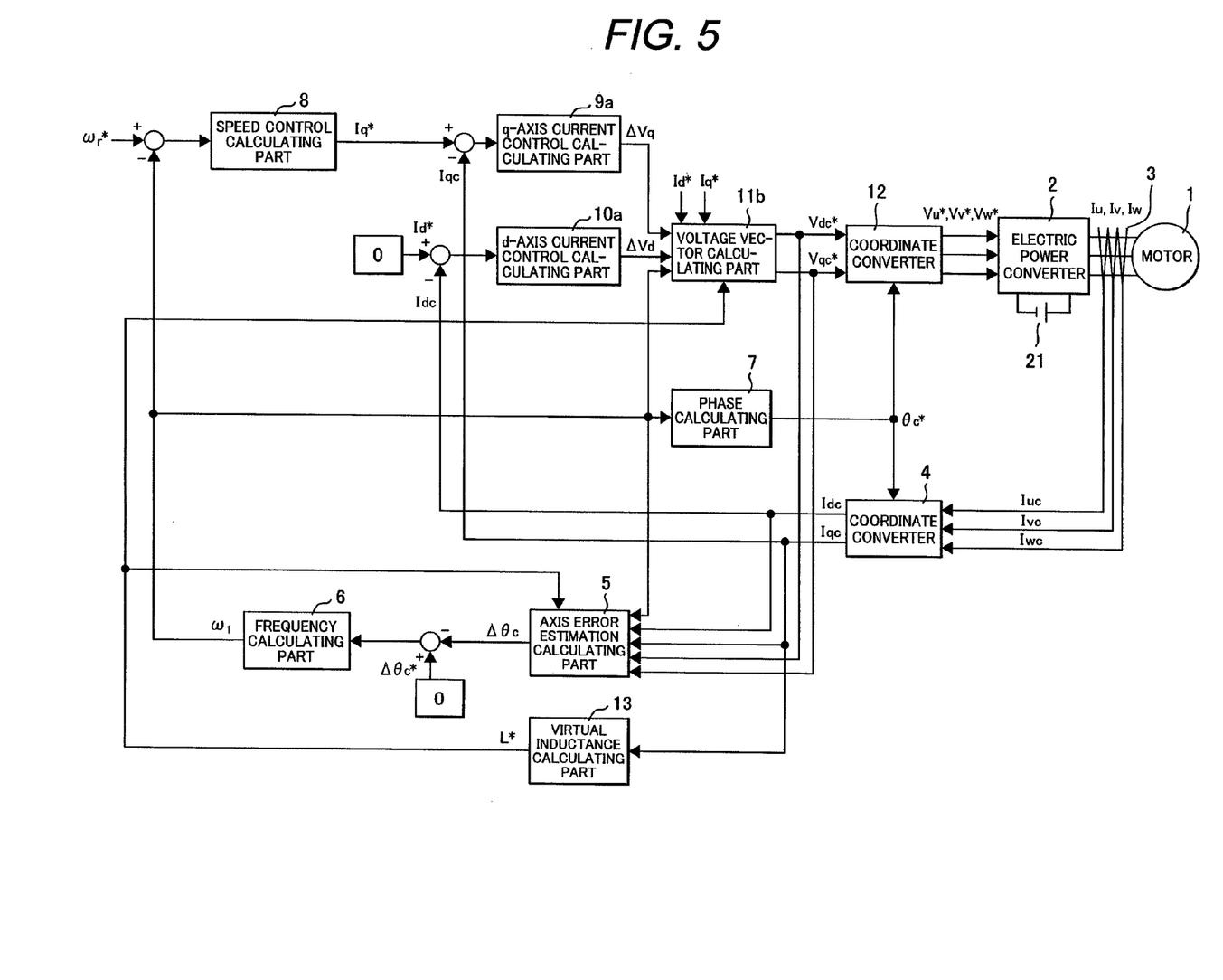
FIG. 5 shows the structure of a weak-magnetic-field vector controller for a permanent magnet motor in still another embodiment.

FIG. 5 shows yet another embodiment of the present invention.

In an exemplary structure in this embodiment, high-efficiency control is applied to a vector controller including d-axis and q-axis current control calculating parts.

Reference numerals 1 to 8, 12, 13, and 21 in the drawing indicate elements identical to the corresponding elements in FIG. 1.

Reference characters 9*a* indicate a q-axis current control calculating part for outputting a voltage value ΔVq so that the detected q-axis current value Iqc matches the commanded q-axis current value Iq*. Reference characters 10*a* indicate a d-axis current control calculating part for outputting a voltage value ΔVd so that the detected d-axis current value Idc matches the commanded d-axis current value Id*. Reference characters 11*b* is voltage vector calculating part which calculates the first commanded voltage values Vdc* and Vqc* by using the commanded d-axis and q-axis current values Id* and Iq*, the d-axis and q-axis current control output values ΔVd and ΔVq, the calculated frequency ω₁, the electric constant of the motor 1, and the calculated virtual inductance value L* as in equation (29).

[Equation 29]

$$\begin{bmatrix} Vdc^* \\ Vqc^* \end{bmatrix} = \begin{bmatrix} -\omega_1 * L^* & R^* \\ R^* & \omega_1 \cdot Ld^* \end{bmatrix} \cdot \begin{bmatrix} Id^* \\ Iq^* \end{bmatrix} + \begin{bmatrix} 0 \\ \omega_1 \cdot Ke^* \end{bmatrix} + \begin{bmatrix} \Delta Vd \\ \Delta Vd \end{bmatrix} \quad (29)$$

This type of vector control method can also provide the same effect as in the first embodiment. In this embodiment, the calculated virtual inductance value L* was obtained from the detected q-axis current value Iqc and motor constant and then used for voltage vector calculation and axis error estimation calculation. However, even when the virtual inductance setting L** is set to an equivalent to the d-axis inductance value Ld, a superior result is obtained.

In this embodiment as well, torque-current ratio characteristics, which are the same as when the virtual inductance setting part 13*a* is provided, can be obtained.

Fourth Embodiment

In the methods in the first to third embodiments, the current detector 3, which is expensive, is used to detect the three-phase AC currents Iu, Iv, and Iw. However, a controller in which the currents are detected in an inexpensive manner is also applicable.

Figure 6:
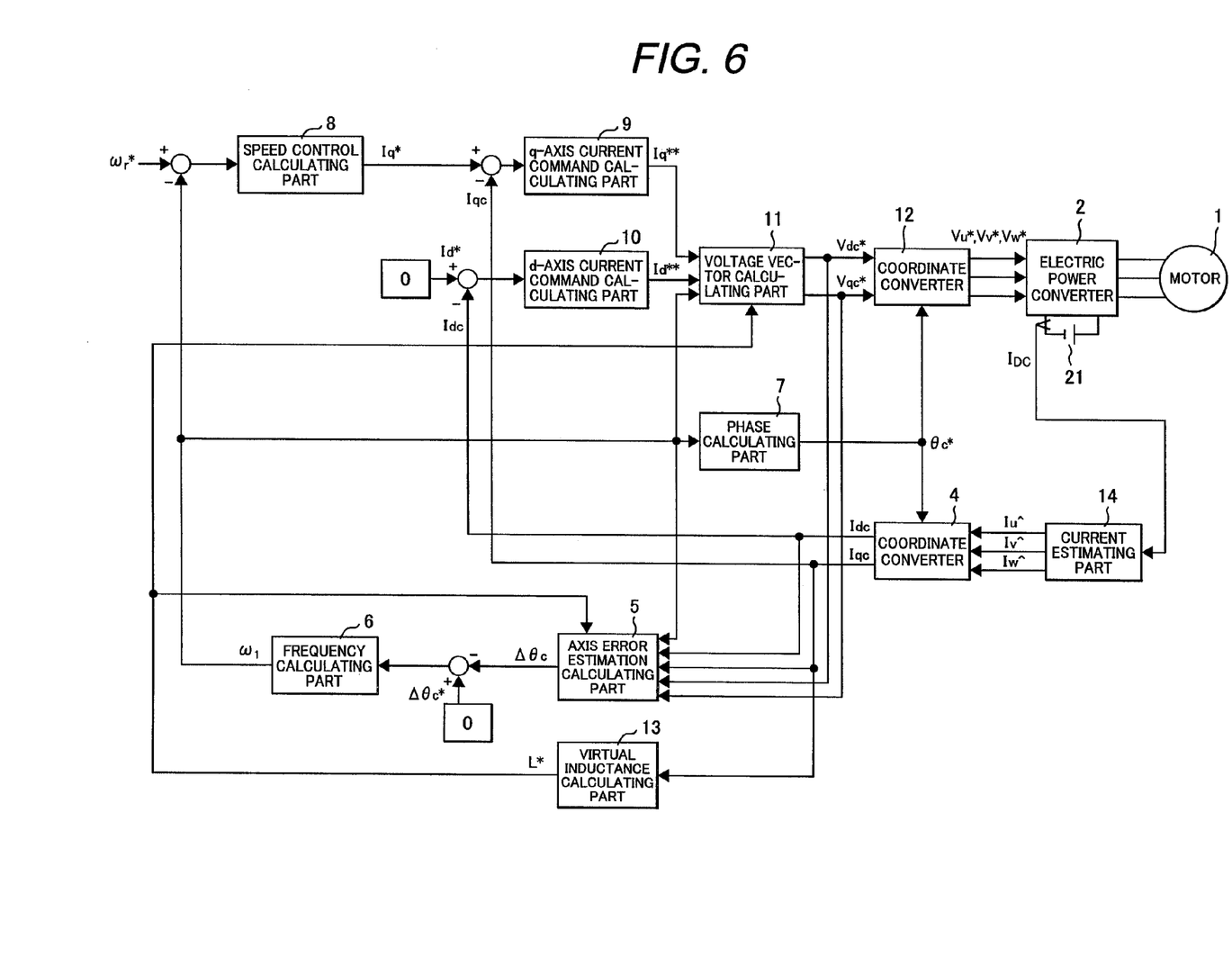
FIG. 6 shows the structure of a weak-magnetic-field vector controller for a permanent magnet motor in yet another embodiment.

FIG. 6 shows a fourth embodiment for implementing this type of controller.

Reference numerals 1, 2, 4 to 13, and 21 in the drawing indicate elements identical to the corresponding elements in FIG. 1. Reference numeral 14 indicates a current estimating part for estimating the three-phase AC currents Iu, Iv, and Iw, which pass through the motor 1, from a DC current IDC that passes in the input bus of the electric power converter.

These estimated current values Iu^, Iv^, and Iw^ are used by the coordinate converter 4 to calculate the detected d-axis and q-axis current values Idc and Iqc.

In this type of current sensor-less control method as well, Id* matches Idc and Iq* matches Iqc, so operations are performed in the same way as in the embodiments described above. Accordingly, it is apparent that the same effect is obtained.

In this embodiment, the calculated virtual inductance value L* was obtained from the detected q-axis current value Iqc and motor constant and then used for voltage vector calculation and axis error estimation calculation. However, even when the virtual inductance setting L** is set to an equivalent to the d-axis inductance value Ld, a superior result is obtained.

In this embodiment as well, torque-current ratio characteristics, which are the same as when the virtual inductance setting part 13*a* is provided, can be obtained.

Fifth Embodiment

Figure 7:
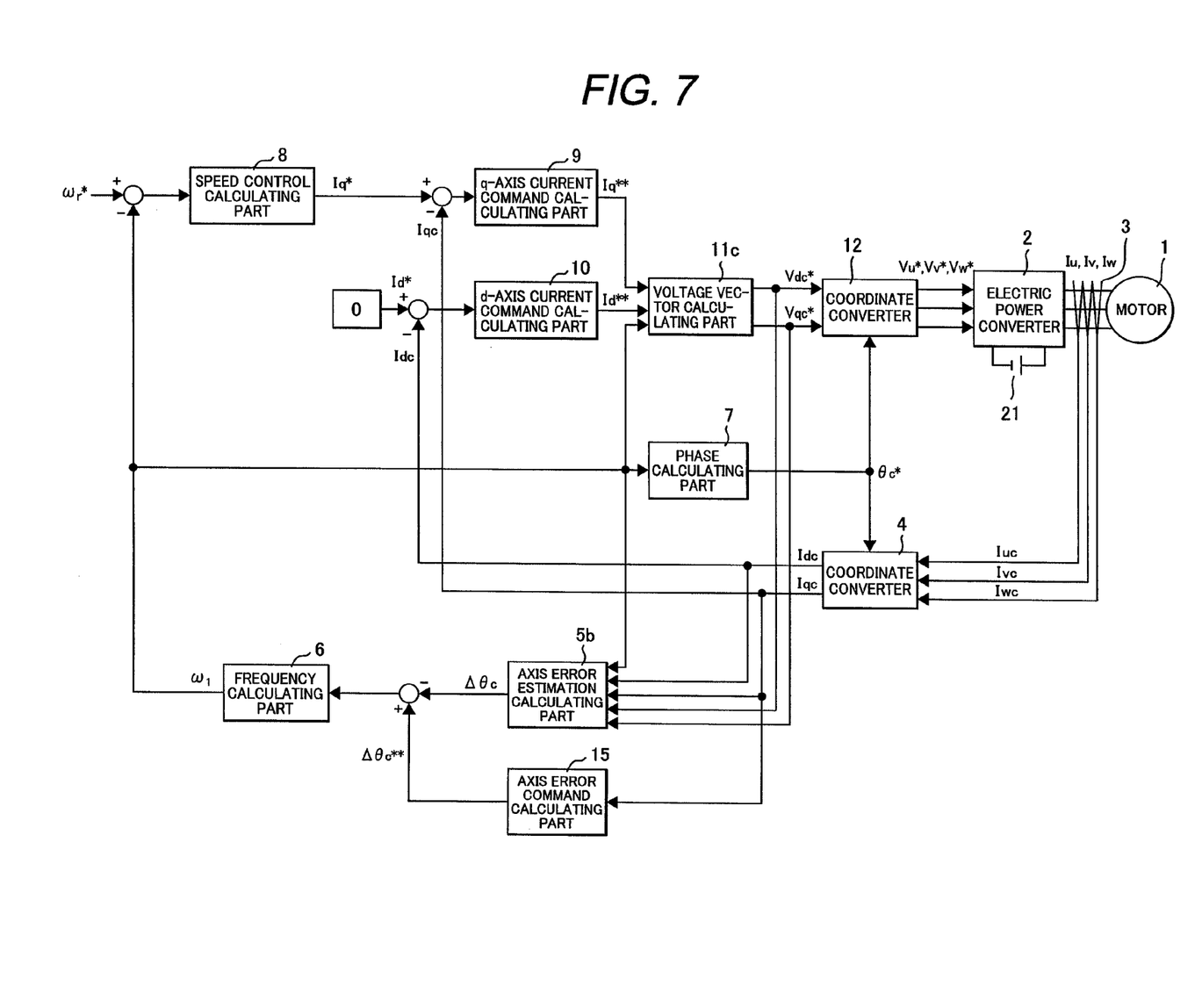
FIG. 7 shows the structure of a weak-magnetic-field vector controller for a permanent magnet motor in yet another embodiment.

FIG. 7 shows still another embodiment of the present invention.

In the first embodiment, the calculated virtual inductance value L* was obtained and then used for voltage vector calculation and axis error estimation calculation. However, a high-efficiency vector controller for a permanent magnet motor in this embodiment calculates the commanded axis error Δθc*. An exemplary structure of this type of vector controller will be described below.

Reference numerals 1 to 4, 6 to 10, 12, and 21 in the drawing indicate elements identical to the corresponding elements in FIG. 1.

Reference characters 5b indicate an axis error estimation calculating part for estimating, by calculation, axis error $\Delta\theta$, which is a deviation between the commanded rotation phase value $\theta c^*$ and the motor rotation phase value $\theta$, from the commanded voltage values $Vdc^*$ and $Vqc^*$, the calculated frequency value $\omega_1$, the detected current values $Idc$ and $Iqc$, and the motor constant as in equation (30) and then outputting estimated axis error $\Delta\theta c$.

[Equation 30]

$$\Delta\theta c = \tan^{-1}\left[\frac{Vdc^* - R^* \cdot Idc + \omega_1 \cdot Lq^* \cdot Iqc}{Vqc^* - R^* \cdot Iqc - \omega_1 \cdot Lq^* \cdot Idc}\right] \quad (30)$$

Reference characters 11c indicate a voltage vector calculating part for outputting the commanded d-axis and q-axis voltage values $Vdc^*$ and $Vqc^*$ according to the electric constant of the motor 1, the second commanded current values $Id^{}$ and $Iq^{}$, and the calculated frequency $\omega_1$ as in equation (31).

[Equation 31]

$$\begin{bmatrix} Vdc^* \\ Vqc^* \end{bmatrix} = \begin{bmatrix} -\omega_1 \cdot L_q^* & R^* \\ R^* & \omega_1 \cdot Ld^* \end{bmatrix} \cdot \begin{bmatrix} Id^{} \\ Iq^{} \end{bmatrix} + \begin{bmatrix} 0 \\ \omega_1 \cdot Ke^* \end{bmatrix} \quad (31)$$

Reference numeral 15 indicates an axis error command calculating part for outputting the commanded axis error $\Delta\theta c^*$, which is obtained from equation (32) by using the detected q-axis current value $Iqc$ in the axis error $\Delta\theta_{opt}$ in equation (8).

[Equation 32]

$$\Delta\theta c^* = \sin^{-1}\left[\frac{Ke^* - \sqrt{Ke^{*2} + 8 \cdot (Ld^* - Lq^*)^2 \cdot Iqc^2}}{4 \cdot (Ld^* - Lq^*) \cdot Iqc}\right] \quad (32)$$

In this embodiment as well, torque-current ratio characteristics, which are the same as when the virtual inductance setting part 13a is provided, can be obtained.

Sixth Embodiment

Figure 8:
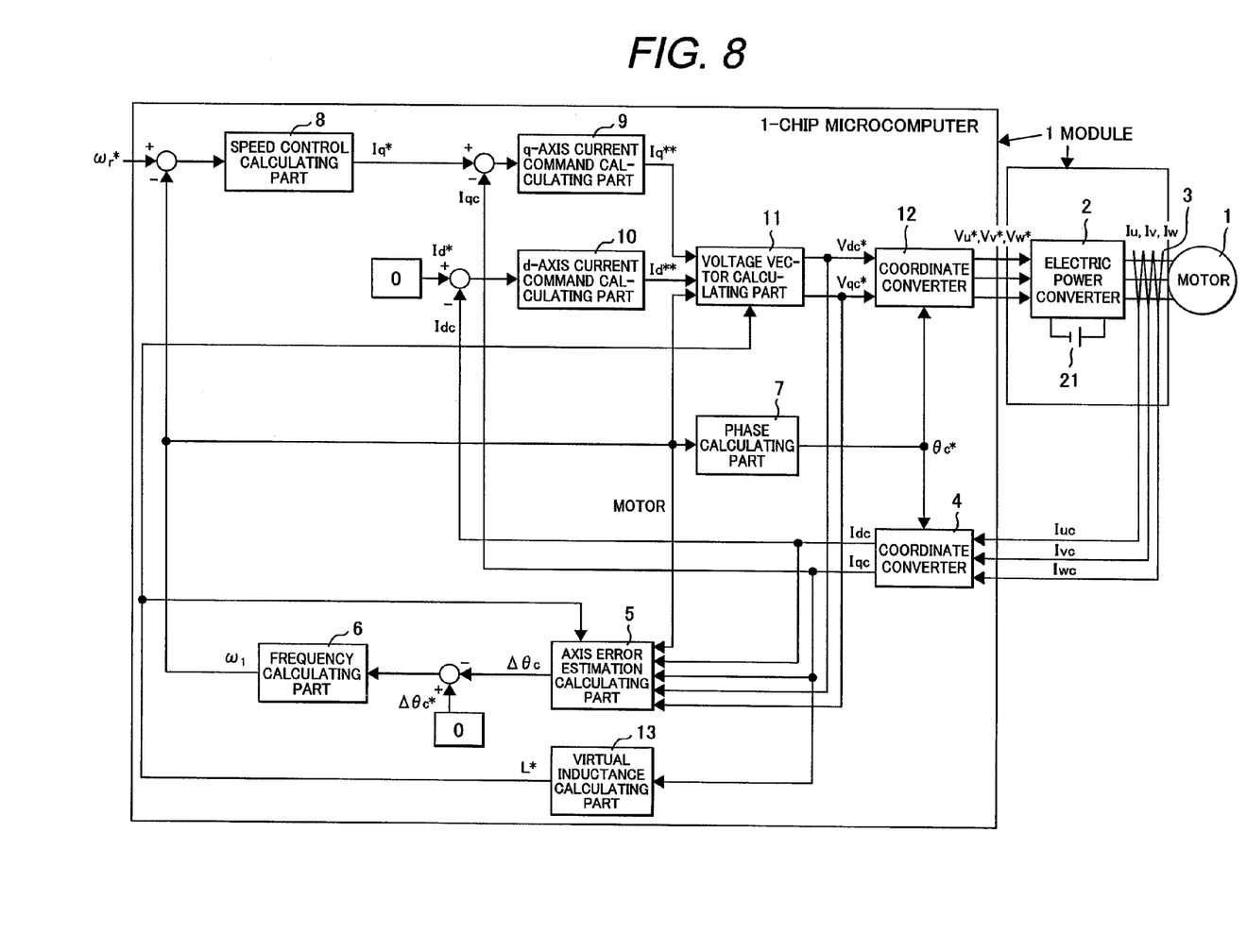
FIG. 8 shows an exemplary structure in a mode of the present invention.

An example in which the present invention is applied to a module will be described with reference to FIG. 8.

This embodiment indicates a mode in the first embodiment.

The coordinate converter 4, axis error estimation calculating part 5, frequency calculating part 6, phase calculating part 7, speed control calculating part 8, q-axis current command calculating part 9, d-axis current command calculating part 10, voltage vector calculating part 11, coordinate converter 12, and virtual inductance calculating part 13 are implemented on a single-chip microprocessor.

The single-chip microprocessor and the electric power converter are each included in a single module mounted on the same board. The term module used in this document means a standardized constitution unit. A module includes separable hardware or software parts. Although modules are preferably mounted on the same board from the viewpoint of manufacturing, the mounting of them is not limited to the same board.

Accordingly, modules may be mounted on a plurality of circuit boards included in a single case.

Similar structures can also be implemented in the other embodiments.

What is claimed is:

1. A vector controller for a permanent magnet motor that controls output voltage values of an electric power converter for driving a permanent magnet motor according to commanded current values and detected current values on a d-axis and a q-axis, a calculated frequency, and a motor constant setting, and, to have axis error, which is a deviation between a commanded rotation phase value obtained by integrating the calculated frequency and the rotation phase value of the permanent magnet motor, match commanded axis error, controls the calculated frequency, wherein commanded output voltage values of the electric power converter and estimated axis error are calculated by using a virtual inductance value, with the commanded d-axis current value and the commanded axis error being set to approximately zero.

2. The vector controller according to claim 1, wherein the virtual inductance value is such that the current value of the permanent motor is lessened at the same torque.

3. The vector controller according to claim 1, wherein the virtual inductance value is calculated from the motor constant and the detected or commanded q-axis current value, or a value referenced from a table is set as the virtual inductance value.

4. The vector controller according to claim 1, wherein when the q-axis inductance of the motor is larger than the d-axis inductance value, the virtual inductance value is set to a value that is larger than the d-axis inductance value but smaller than half the difference of the d-axis inductance value and the q-axis inductance value; when the q-axis inductance of the motor is smaller than the d-axis inductance value, the virtual inductance value is set to a value that is larger than the difference of the d-axis inductance value and the q-axis inductance value but smaller than the d-axis inductance value.

5. The vector controller according to claim 1, wherein the virtual inductance value is the d-axis inductance value.

6. The vector controller according to claim 1, wherein the commanded output voltage values of the electric power converter are calculated according to second commanded current values, which are calculated from first commanded d-axis and q-axis current values and first detected d-axis and q-axis current values, as well as the motor constant, the calculated frequency, and the virtual inductance value.

7. The vector controller according to claim 1, wherein the commanded output voltage values of the electric power converter are calculated according to current control output values, which are calculated from first commanded d-axis and q-axis current values and first detected d-axis and q-axis current values, as well as output values obtained from voltage vector calculation based on commanded current values, the motor constant, the calculated frequency, and a calculated virtual inductance.

8. The vector controller according to claim 1, wherein the detected current values are the values of motor currents reproduced according to current values detected on an input DC bus of the electric power converter.

9. The vector controller according to claim 1, wherein the axis error is calculated from the commanded d-axis and q-axis voltage values, the detected motor current values or values calculated by estimation based on the reproduced currents, the motor constant, and the virtual inductance value.

10. An inverter module, comprising the controller for a permanent magnet motor according to claim 1 and an electric power converter for converting DC current to AC current.

11. A vector controller for a permanent magnet motor that controls output voltage values of an electric power converter for driving a permanent magnet motor according to the electric power converter, commanded current values and detected current values on a d-axis and a q-axis, a calculated frequency, and a motor constant setting, and, to have axis error, which is a deviation between a commanded rotation phase value obtained by integrating the calculated frequency and the rotation phase value of the permanent magnet motor, match commanded axis error, controls the calculated frequency, wherein the commanded axis error is calculated so that the current values of the permanent magnet motor are minimized at the same torque, with the commanded d-axis current value being set to approximately zero, wherein the output voltage values of the electric power converter are calculated according to second commanded current values, which are calculated from first commanded d-axis and q-axis current values and first detected d-axis and q-axis current values, as well as the motor constant, the calculated frequency, and a calculated virtual inductance value or virtual inductance setting.

12. The vector controller according to claim 11, wherein the commanded axis error is calculated from the motor constant and the detected or commanded q-axis current value or a value referenced from a table is set as the commanded axis error.

13. The vector controller according to claim 11, wherein commanded output voltage values of the electric power converter are calculated according to current control output values, which are calculated from first commanded d-axis and q-axis current values and first detected d-axis and q-axis current values, and output values resulting from voltage vector calculation based on the commanded current values, the motor constant, and the calculated frequency.

14. The vector controller according to claim 11, wherein the detected current values are the values of motor currents reproduced according to current values detected on an input DC bus of the electric power converter.

15. The vector controller according to claim 11, wherein the axis error is calculated from the commanded d-axis and q-axis voltage values, the detected motor current values or values calculated by estimation based on the reproduced currents, and the motor constant.

16. An inverter module, comprising the controller for a permanent magnet motor according to claim 11 and an electric power converter for converting DC current to AC current.

* * * * *